(12) United States Patent
Chen

(10) Patent No.: US 10,836,098 B2
(45) Date of Patent: Nov. 17, 2020

(54) 3D PRINTING METHOD FOR BINARY STEREOLITHOGRAPHY 3D PRINTER

(71) Applicants: XYZPRINTING, INC., New Taipei (TW); KINPO ELECTRONICS, INC., New Taipei (TW)

(72) Inventor: Peng-Yang Chen, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 436 days.

(21) Appl. No.: 15/698,071

(22) Filed: Sep. 7, 2017

(65) Prior Publication Data

US 2018/0339446 A1     Nov. 29, 2018

(30) Foreign Application Priority Data

May 27, 2017  (CN) .......................... 2017 1 0389275

(51) Int. Cl.
*B29C 64/40* (2017.01)
*B29C 64/106* (2017.01)
(Continued)

(52) U.S. Cl.
CPC .......... *B29C 64/106* (2017.08); *B29C 64/124* (2017.08); *B29C 64/40* (2017.08); *B33Y 50/02* (2014.12); *H04N 1/4092* (2013.01)

(58) Field of Classification Search
CPC ....... B33Y 50/00; B33Y 50/02; B29C 64/124; B29C 64/129; B29C 64/386; B29C 64/393

(Continued)

(56) References Cited

U.S. PATENT DOCUMENTS

| 5,454,069 A | 9/1995 | Knapp et al. |
| 7,088,432 B2 * | 8/2006 | Zhang ................... G03F 7/0037 355/77 |
| 2017/0102679 A1 | 4/2017 | Greene et al. |

FOREIGN PATENT DOCUMENTS

| CN | 105425546 A | 3/2016 |
| EP | 1026564 A2 | 8/2000 |

(Continued)

OTHER PUBLICATIONS

Office Action dated May 22, 2020 of the corresponding China patent application.

(Continued)

*Primary Examiner* — Jeffrey M Wollschlager
*Assistant Examiner* — Xue H Liu
(74) *Attorney, Agent, or Firm* — Chun-Ming Shih

(57) ABSTRACT

A 3D printing method for binary stereolithography 3D printer includes following steps of: controlling a binary stereolithography 3D printer (20) to retrieve a plurality of gray-scale slice images (802,822,842); mapping a pixel value of each pixel of each gray-scale slice images (802, 822,842) from a pixel value full range to an accumulation value range for obtaining a printing parameter of each pixel; selecting one of the gray-scale slice images (802,822,842) orderly; controlling a binary lighting module (204) of the binary stereolithography 3D printer (20) to irradiate for generating a layer of physical slice model (320,322,340,342) according to the printing parameter of each pixel of the selected gray-scale slice image (802,822,842); and repeatedly executing aforementioned steps to generate a physical 3D model (8') constituted by a stack of multiple of the physical slice models (320,322,340,342).

11 Claims, 14 Drawing Sheets

(51) Int. Cl.
*B29C 64/124* (2017.01)
*B33Y 50/02* (2015.01)
*H04N 1/409* (2006.01)

(58) Field of Classification Search
USPC .......................................................... 264/401
See application file for complete search history.

(56) References Cited

FOREIGN PATENT DOCUMENTS

| | | |
|---|---|---|
| EP | 1894704 A1 | 3/2008 |
| JP | 2010089438 A | 4/2010 |

OTHER PUBLICATIONS

Office Action dated Mar. 3, 2020 of the corresponding Japan patent application.

\* cited by examiner

802

| 190 | 190 | 190 | 190 | 190 |
|---|---|---|---|---|
| 190 | 255 | 255 | 255 | 190 |
| 190 | 255 | 255 | 255 | 190 |
| 190 | 255 | 255 | 255 | 190 |
| 190 | 190 | 190 | 190 | 190 |

| 125 | 125 | 125 | 125 | 125 |
|---|---|---|---|---|
| 125 | 155 | 155 | 155 | 125 |
| 125 | 155 | 205 | 155 | 125 |
| 125 | 155 | 155 | 155 | 125 |
| 125 | 125 | 125 | 125 | 125 |

| 60 | 60 | 60 | 60 | 60 |
|---|---|---|---|---|
| 60 | 105 | 105 | 105 | 60 |
| 60 | 105 | 180 | 105 | 60 |
| 60 | 105 | 105 | 105 | 60 |
| 60 | 60 | 60 | 60 | 60 |

| 2 | 2 | 2 | 2 | 2 |
|---|---|---|---|---|
| 2 | 3 | 3 | 3 | 2 |
| 2 | 3 | 3 | 3 | 2 |
| 2 | 3 | 3 | 3 | 2 |
| 2 | 2 | 2 | 2 | 2 |

| 1 | 1 | 1 | 1 | 1 |
|---|---|---|---|---|
| 1 | 2 | 2 | 2 | 1 |
| 1 | 2 | 3 | 2 | 1 |
| 1 | 2 | 2 | 2 | 1 |
| 1 | 1 | 1 | 1 | 1 |

| 0 | 0 | 0 | 0 | 0 |
|---|---|---|---|---|
| 0 | 1 | 1 | 1 | 0 |
| 0 | 1 | 2 | 1 | 0 |
| 0 | 1 | 1 | 1 | 0 |
| 0 | 0 | 0 | 0 | 0 |

FIG.10C

3D PRINTING METHOD FOR BINARY STEREOLITHOGRAPHY 3D PRINTER

BACKGROUND OF THE INVENTION

Field of the Invention

The technical field relates to 3D printing method and more particularly related to 3D printing method for binary stereolithography 3D printer.

Description of Related Art

In the 3D printer using a liquid modeling material (such as photopolymer resin), The 3D printer being most widely used is digital light processing (DLP) 3D printer and stereolithography (SLA) 3D printer. Compare to DLP 3D printer, the SLA 3D printer has the advantages of small size, wide printing range, low cost and high printing resolution and so forth.

Above-mentioned DLP 3D printer arranges a projection display module (each light spot of the projection display module has 256 levels of brightness variations), so the curing extent of each position of the physical 3D model manufactured by the DLP 3D printer also has 256 levels. Compare to this DLP 3D printer, above-mentioned SLA 3D printer arranges a binary light module (each light spot of the binary light module only has 2 levels (lighting on and off) of brightness variations). Under the premise of consideration without adjustment of power energy of the light source, the curing extent of each position of the physical 3D model manufactured by the SLA 3D printer only has 2 levels (print and not print), such that the fine degree of each position is obviously bad.

Please refer to FIG. 1A and FIG. 1B, FIG. 1A is a flowchart of a 3D printing method according to the related art, FIG. 1B is a schematic view of a printing process of a stereolithography 3D printer according to related art. Those figures are used to detailedly illustrate above-mentioned disadvantages of the SLA 3D printer of the related art.

As shown in figures, the stereolithography 3D printing method of the related art first executes a slicing process to a loaded 3D object data 10 for obtaining a plurality of slice object data (step S10), FIG. 1B takes three slice object data 120, 140, and 160 for example. Furthermore, above-mentioned slice object data 120, 140, and 160 are respectively represented by form of black-white images.

Because of arrangement of binary light module, the stereolithography 3D printing method of the related art must further execute a printing analysis to three black-white images respectively corresponding to the three slice object data 120, 140, and 160 for obtaining three layers of printing data 122, 142, and 162 respectively corresponding to the three slice object data 120, 140, and 160 as shown in FIG. 1B (step S12). More specifically, the stereolithography 3D printing method of the related art configures a printing position corresponding to a pixel of the black-white image to "irradiation" (being represented by data value "1" in the printing data 122, 142, and 162 of FIG. 1B) when any pixel oft each black-white image is white, and configures a printing position corresponding to a pixel of the black-white image to "without irradiation" (being represented by data value "0" in the printing data 122, 142, and 162 of FIG. 1B) when any pixel oft each black-white image is black.

Finally, the stereolithography 3D printing method of the related art executes a stereolithography 3D printing for manufacturing a physical 3D model 10' according to the printing data 122,142, and 162 layer by layer (step S14).

FIG. 1B illustrates a side-view of the physical 3D model 10', it can be understandable according to FIG. 1B that an obvious hierarchy effect is appeared on a surface of the physical 3D model 10' manufactured by the stereolithography 3D printing method of the related art based on the printing data 122, 142, and 162 because there are only two levels of height variations of each position of the generated printing data 122, 142, and 162, such that a fine degree of the physical 3D model 10' is bad.

SUMMARY OF THE INVENTION

The present disclosed example is directed to a 3D printing method for binary stereolithography 3D printer, wherein a curing extent of each position of a physical 3D model generated by this 3D printing method has more than two levels of variations.

One of the exemplary embodiments, a 3D printing method for binary stereolithography 3D printer, the 3D printing method being applied to a binary stereolithography 3D printer, the 3D printing method comprising following steps: a) retrieving a plurality of gray-scale slice images corresponding to a 3D object; b) mapping a pixel value of each pixel value of each gray-scale image from a pixel value full range to an accumulation value range for obtaining one of at least three accumulation values and making the obtained accumulation value as a printing parameter of each pixel, wherein the accumulation value range comprise the at least three accumulation values, the pixel value full range comprises all the pixel values of all the pixels of all the gray-scale images; c) selecting one of the gray-scale slice images orderly; d) controlling a binary light module of the binary stereolithography 3D printer to irradiate for manufacturing a layer of physical slice model according to the printing parameter of each pixel of the selected gray-scale slice image; and, e) executing the steps c) to the step d) repeatedly until a physical 3D model corresponding to the 3D object is manufactured.

One of the exemplary embodiments, the step b) comprises following steps: b1) retrieving a mapping relation of one-by-one mapping at least three pixel value sub-ranges of the pixel value full range to the at least three accumulation values of the accumulation value range, wherein each pixel value sub-range respectively comprises a plurality of pixel values which are different from each other; and, b2) determining each pixel value sub-range which the pixel value of each pixel is within, and configuring each corresponded accumulation value as the printing parameter of each pixel according to the mapping relation.

One of the exemplary embodiments, a number of the pixels of one of the pixel value sub-range is different from a number of the pixels of another pixel value sub-range.

One of the exemplary embodiments, the step b) comprises a step b3) looking the corresponded accumulation value up in a lookup table according to the pixel value of each pixel, and making the accumulation value as the printing parameter, wherein the lookup table records a corresponding relation between all of the pixel values of the pixel value full range and the at least three accumulation values of the accumulation value range.

One of the exemplary embodiments, the step b) comprises a step b4) mapping the pixel value of the pixel value from the pixel value full range to the accumulation value range for obtaining one of the at least three accumulation values and making the obtained accumulation value as the printing parameter of each pixel when determining that any pixel corresponds to a surface of the 3D object.

One of the exemplary embodiments, the step b) further comprises a step b5) configuring the printing parameter of the pixel as a default accumulation value within the accumulation value range when determining that any pixel corresponds to an interior of the 3D object.

One of the exemplary embodiments, the binary stereolithography 3D printer comprises a modeling tank used to contain liquid modeling material, the step d) is configured to control the binary light module to respectively irradiate each printing position in the modeling tank corresponding to each pixel based on a default curing power until an accumulative lighting time being consistent with the printing parameter of each pixel elapses.

One of the exemplary embodiments, the maximum accumulation value is a fully curing time which making the liquid modeling material completely cured when irradiating the liquid modeling material based on a curing power for the fully curing time, one of the accumulation values is a partly curing time which making the liquid modeling material partly cured when irradiating the liquid modeling material based on a curing power for the partly curing time, the minimum accumulation value is 0.

One of the exemplary embodiments, the binary stereolithography 3D printer comprises a modeling tank used to contain liquid modeling material, the step d) is configured to control the binary light module to respectively irradiate each printing position in the modeling tank corresponding to each pixel based on a single-time irradiation time and a weakening power until an accumulative lighting frequency of each printing position is consistent with the printing parameter corresponding to each pixel.

One of the exemplary embodiments, the maximum accumulation value is a fully curing frequency which making the liquid modeling material completely cured when irradiating the liquid modeling material based on the fully curing frequency and the weakening power, one of the accumulation values is a partly curing frequency which making the liquid modeling material partly cured when irradiating the liquid modeling material based on the fully curing frequency and the weakening power, the minimum accumulation value is 0.

One of the exemplary embodiments, the 3D printing method further comprises a step d0) before the step d), determining the weakening power according to a number of the at least three accumulation values of the accumulation value range and a default curing power of the binary light module, wherein the weakening power is less than the curing power.

One of the exemplary embodiments, the binary stereolithography 3D printer comprises a galvanometric module comprising a plurality of prisms, the binary light module is point light source and irradiates a light beam toward the galvanometric module, the step d) is configured to control the galvanometric module to change a plurality of angles of the plurality of the prisms to make the light beam irradiate to a printing position corresponding to each pixel orderly according to the printing parameter of each pixel.

One of the exemplary embodiments, the 3D printing method comprises following steps before the step a):

a01) loading a 3D object data corresponding to a 3D object; and a02) executing a slicing process to the 3D object data for generating the plurality of the gray-scale slice images.

The present disclosed example can achieve the 3D print effect of multi-level light module by the binary stereolithography 3D printer, so as to enhance the fine degree of the generated physical 3D model obviously.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

FIG. 9A is a schematic view of the first gray-scale slice image according to the present disclosed example;

FIG. 9B is a schematic view of the second gray-scale slice image according to the present disclosed example;

FIG. 9C is a schematic view of the third gray-scale slice image according to the present disclosed example;

FIG. 10A is a schematic view of the printing parameters of the first gray-scale slice image according to the present disclosed example;

FIG. 10B is a schematic view of the printing parameters of the second gray-scale slice image according to the present disclosed example;

FIG. 10C is a schematic view of the printing parameters of the third gray-scale slice image according to the present disclosed example;

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1A:
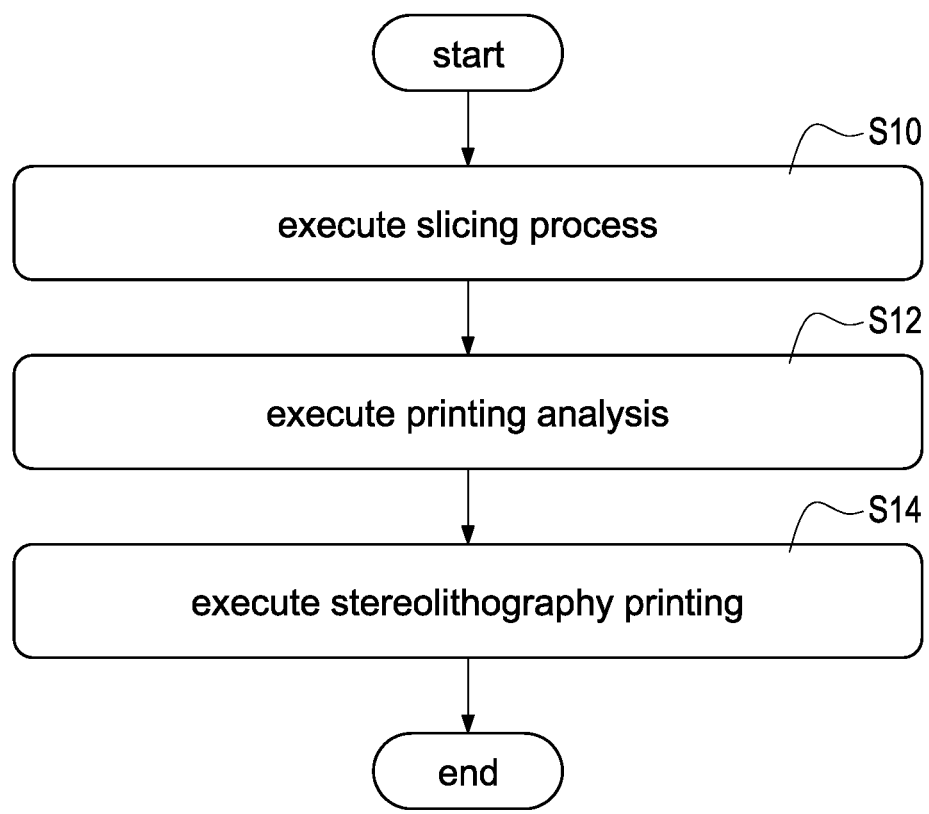
FIG. 1A is a flowchart of a 3D printing method according to the related art.
Figure 1B:
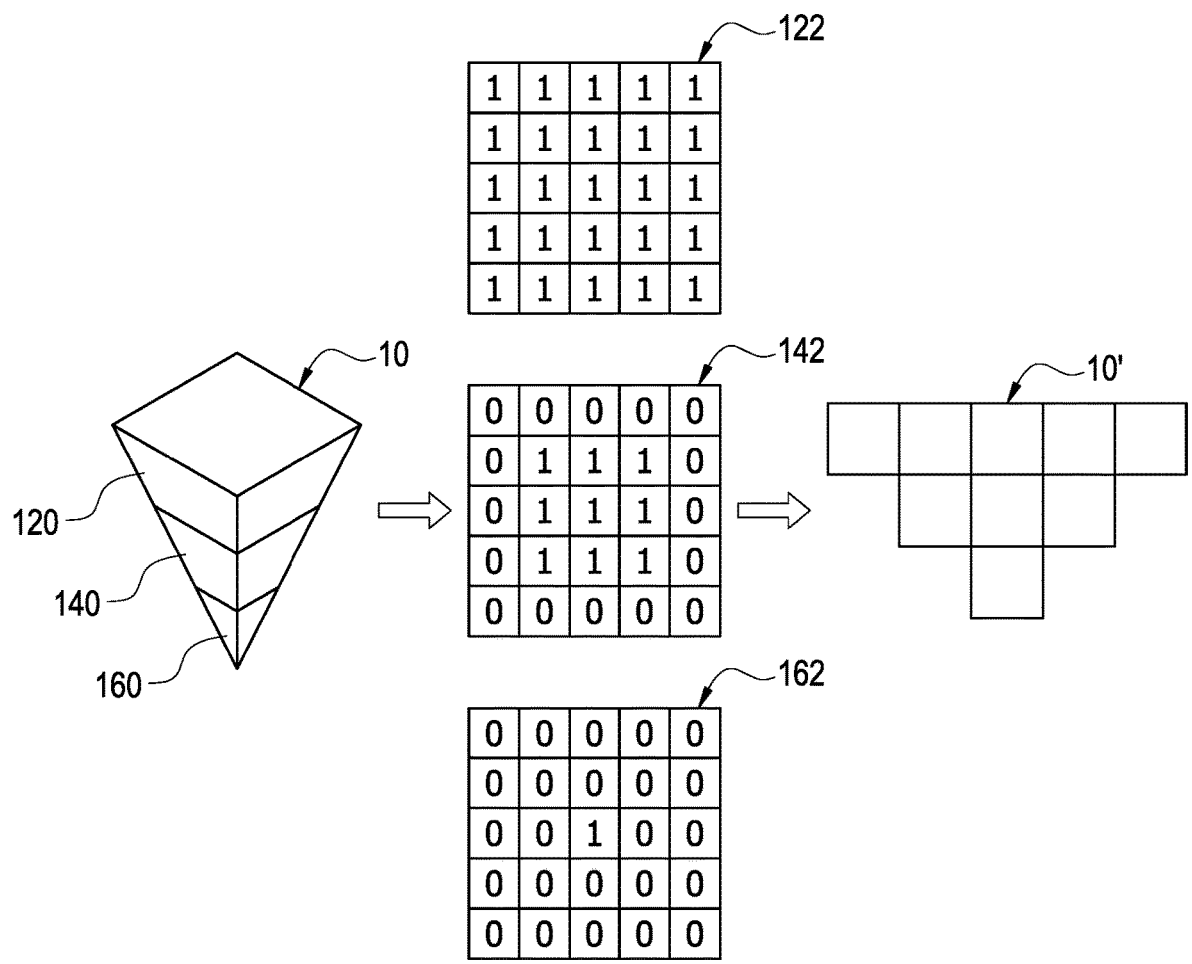
FIG. 1B is a schematic view of a printing process of a stereolithography 3D printer according to related art.
Figure 2A:
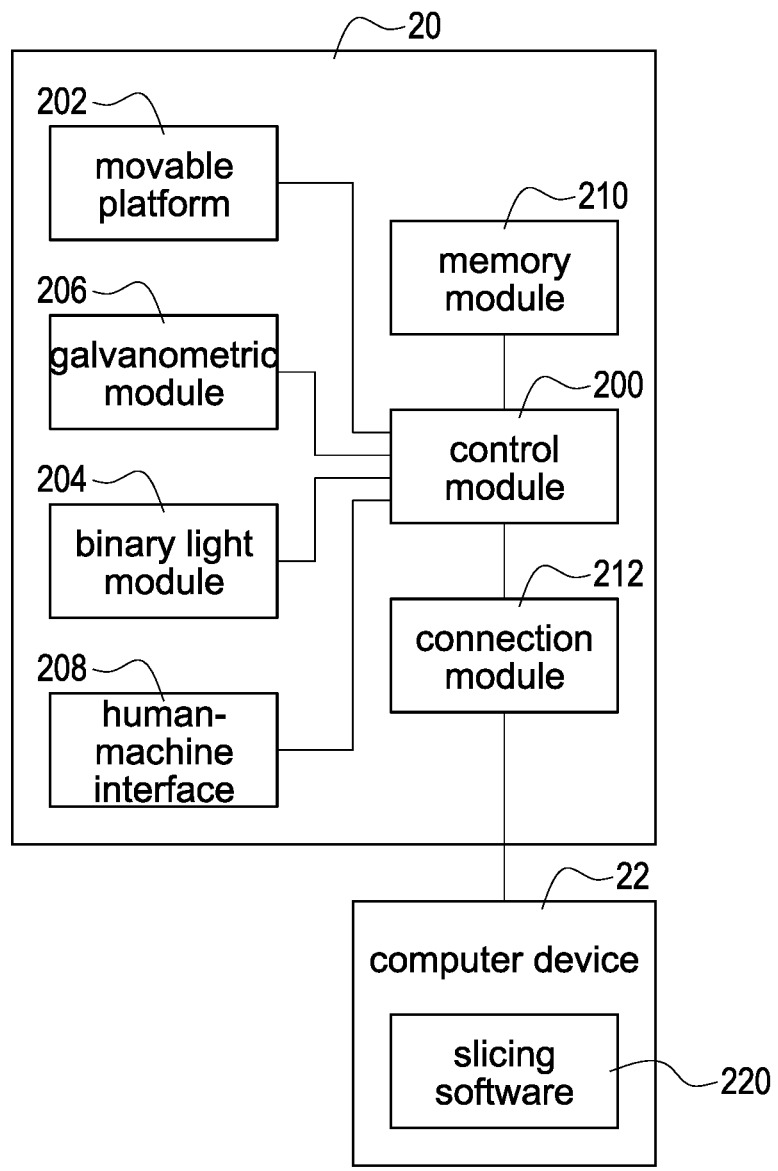
FIG. 2A is an architecture diagram of a binary stereolithography 3D printer according to the first embodiment of the present disclosed example.

First, please refer to FIG. 2A, which is an architecture diagram of a binary stereolithography 3D printer according to the first embodiment of the present disclosed example. As shown in figure, this embodiment discloses a 3D printing system comprising a binary stereolithography 3D printer 20 (hereinafter the 3D printer 20) and a slicing software 220.

The slicing software 220 may be used to load 3D object data corresponding to a set of 3D object when being executed by a computer device 22 (such as desktop computer, laptop, cloud server or smartphone), and execute a slicing process to the 3D object data for generating a plurality of gray-scale slice images used to stereolithography 3D printing. Above-mentioned slicing process is a common technical mean in the technical field of the 3D printing, the relevant description is omitted for brevity. Then, the 3D printer 20 may irradiate the liquid modeling material according to the plurality of the gray-scale slice images for executing the stereolithography 3D printing to manufacture a physical 3D model corresponding to the 3D object.

In the other embodiment, the slicing software 220 may be stored in a memory module 210 of the 3D printer 20. A control module 200 of the 3D printer 20 may execute the slicing software 220 to load the 3D object data and execute the slicing process for generating the gray-scale slice images.

Figure 2B:
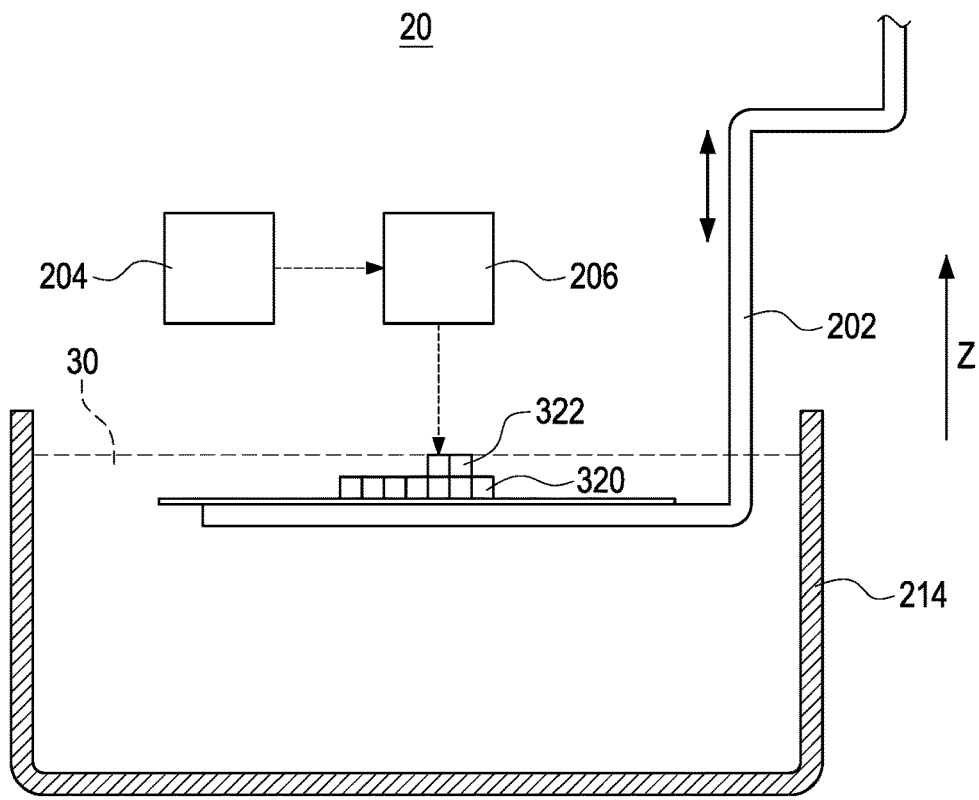
FIG. 2B is an architecture diagram of a binary stereolithography 3D printer according to the second embodiment of the present disclosed example.
Figure 2C:
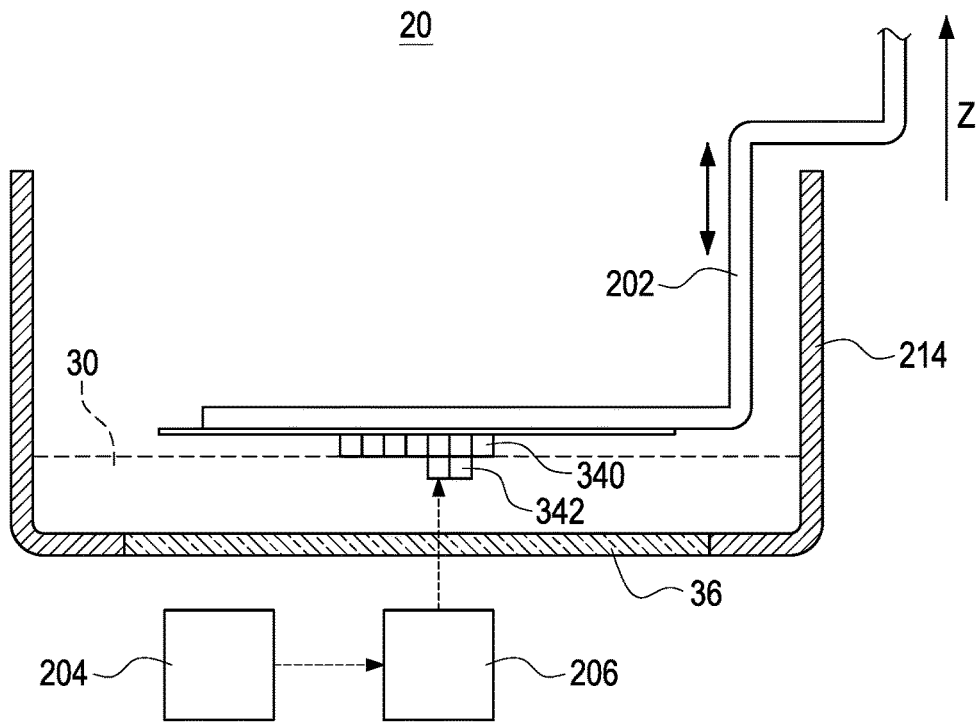
FIG. 2C is an architecture diagram of a binary stereolithography 3D printer according to the third embodiment of the present disclosed example.

The 3D printer 20 mainly comprises the control module 200, a movable platform 202, a binary light module 204, galvanometric module 206, a human-machine interface 208, the memory module 210, a connection module 212 and a modeling tank (such as a modeling tank 214 shown in FIG. 2B or FIG. 2C). The control module 200 is electrically connected to the movable platform 202, the binary light module 204, galvanometric module 206, the human-machine interface 208, the memory module 210, and the connection module 212, and may control the 3D printer 20 to execute stereolithography 3D printing.

The movable platform 202 may move along a default axis direction (such as Z-axis direction) in the modeling tank 214, and is used to carry the printed physical 3D model. the binary light module 204 are used to emit a light beam (such as single point laser light beam) heading to the galvanometric 206. The galvanometric module 206 comprises a plurality of prisms, and is controlled by the control module 200 to change an angle of each prism to change the light path of the light beam for making the light beam irradiate to a designated printing position in the modeling tank 214.

In one embodiment, the binary light module 204 is a point light source. The control module 200 may control the galvanometer module 206 to fast change the angles of multiple prisms of the galvanometer module 206. Thus, the 3D printer 20 may change the printing position currently irradiated by the light beam in a very short time (such as 0.01 seconds), and simulate the irradiation effect of line source or surface light source via the binary light module 204.

The human-machine interface 208, such as button, display, indicator light, buzzer, or any combination of above-mentioned device, is used to receive a user's operation and output a print-related information. The memory module 210 is used to store data, such as gray-scale slice images, a mapping relation or lookup table described later. The connection module 212, such as USB module, PCI bus, module, Wi-Fi module or Bluetooth module, is used to connect to the computer device 22 and receive the gray-scale slice images from the computer device 22. The modeling tank 214 is used to accommodate liquid modeling material, such as photopolymer resin (e.g. UV curable resin).

Please refer to FIG. 2B, which is an architecture diagram of a binary stereolithography 3D printer according to the second embodiment of the present disclosed example. The embodiment of FIG. 2B takes down-illuminated stereolithography 3D printer for example and explanation.

In this embodiment, the binary light module 204 and the galvanometric module 206 are arranged upon the modeling tank 214. The binary light module 204 emits a light beam heading to the galvanometric module 206. The galvanometric module 206 makes the light beam irradiate any printing positions in the modeling tank 214 via changing the angles of multiple prisms.

The modeling tank 214 accommodates the liquid modeling material 30. The movable platform 202 may move along Z-axis direction under the liquid surface of the liquid modeling material 30. During the 3D printer 20 printing, a distance between the modeling surface of the movable platform 202 and the liquid surface of the liquid modeling material 30 is exact the default slice thickness. When the light beams emitted by the binary light module 204 irradiate movable platform 202, the liquid modeling material 30 between the modeling surface and the liquid surface is inspired by light energy and occurs change with the air over the liquid surface, and cure into a layer of physical slice model 320. Then, the 3D printer 20 controls the movable platform 202 to drop a slice thickness for printing next layer of the physical slice model 322, and so on.

Please refer to FIG. 2C simultaneously, which is an architecture diagram of a binary stereolithography 3D printer according to the third embodiment of the present disclosed example. The embodiment of FIG. 2C takes top-illuminated stereolithography 3D printer for example and explanation.

In this embodiment, the modeling tank 214 accommodates the liquid modeling material 30, and a bottom of the modeling tank 214 comprises a translucent region 36. The binary light module 204 and the galvanometric module 206 are arranged below the modeling tank 214. The binary light module 204 emits a light beam heading to the galvanometric module 206. The galvanometric module 206 makes the light beam irradiate any printing positions in the modeling tank 214 via changing the angles of multiple prisms.

The movable platform 202 may move along Z-axis direction under the liquid surface of the liquid modeling material 30. During the 3D printer 20 printing, a modeling surface of the movable platform 202 nestles the liquid surface of the liquid modeling material 30 up. When the light beams emitted by the binary light module 204 irradiate movable platform 202, the liquid modeling material 30 below the liquid surface is inspired by light energy and occurs change with the air over the liquid surface, and cure into a layer of physical slice model 340. Then, the 3D printer 20 controls the movable platform 20

Figure 3:
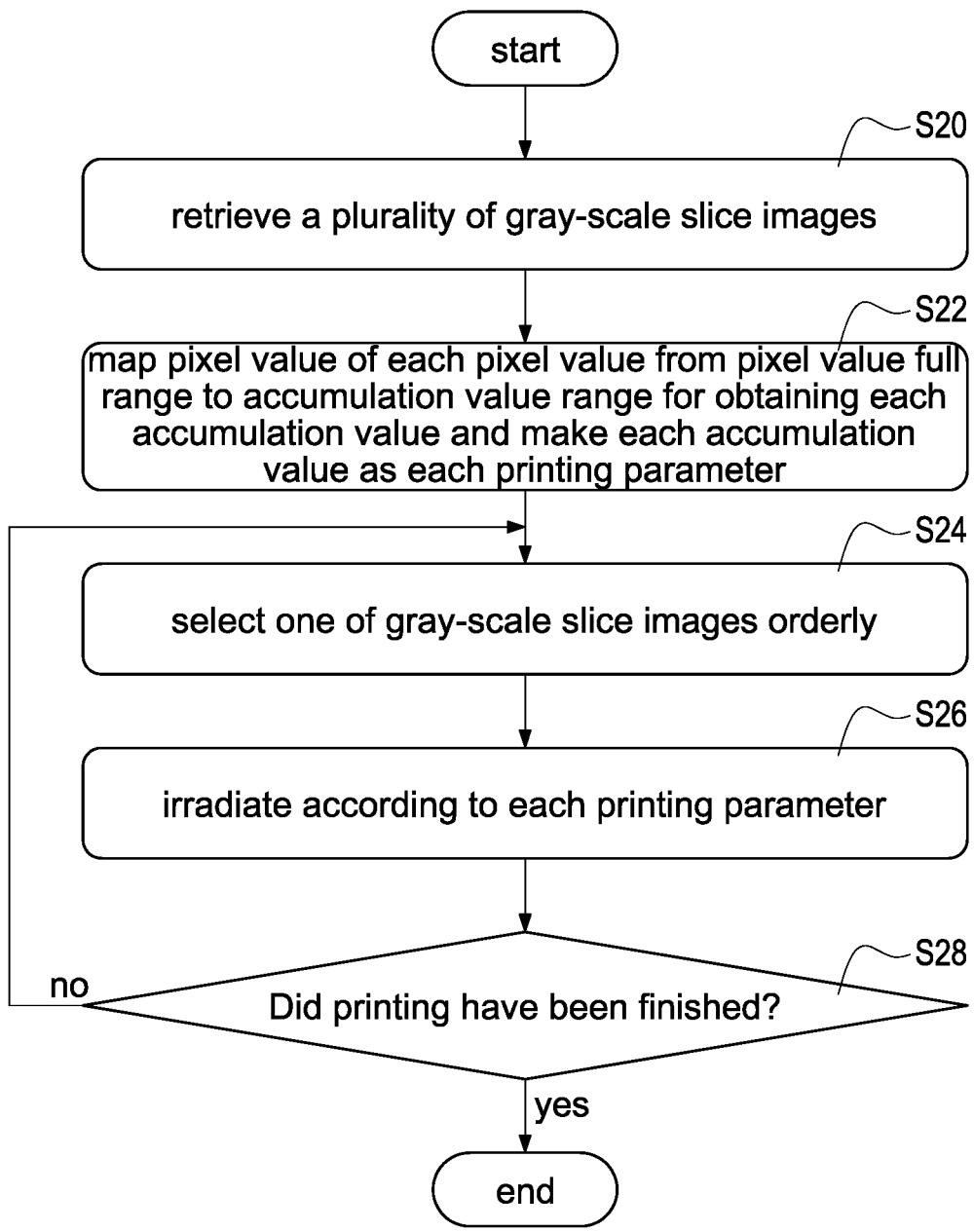
FIG. 3 is a flowchart of a 3D printing method according to the first embodiment of the present disclosed example.

Please refer to FIG. 3, which is a flowchart of a 3D printing method according to the first embodiment of the present disclosed example. The 3D printing method for binary stereolithography 3D printer (hereinafter the 3D printing method) in each embodiment of the present disclosed example is mainly implemented by the 3D printer 20 as illustrated in FIG. 2A-2C.

In the embodiment of FIG. 3, the memory module 210 of the 3D printer 20 further stores printing software, such as firmware of the 3D printer 20. Above-mentioned printing software contains computer-executable program codes or machine codes. When the control module 200 executes the printing software, the control module 200 can control the 3D printer 20 to execute steps S20-S28 shown in FIG. 3.

Step S20: the control module 200 of the 3D printer 20 retrieves a plurality of gray-scale slice images (such as 8 bits gray-scale image or 10 bits gray-scale image) corresponding to a set of the 3D object. More specifically, above-mentioned gray-scale slice images are generated by executing a slicing process to 3D object data corresponding to the 3D object, each gray-scale slice image respectively corresponds to each slice object generated by slicing the 3D object. Each slice object respectively comprises a layer number sorted by order.

For example, if the 3D object may be sliced into one hundred layers of slice objects, there are one hundred gray-scale slice images generated by executing the slicing process to the 3D object data. The one hundred gray-scale slice image are respectively corresponded to the one hundred slice object (layer numbers are 1 to 100), and respectively describes a shape of the corresponded slice objects.

Step S22: the control module 200 maps a pixel value of each pixel value of each gray-scale image from a pixel value full range to an accumulation value range comprising a plurality of accumulation values for obtaining one of a plurality of accumulation values, and makes the obtained accumulation value as a printing parameter of each pixel. More specifically, the pixel value full range comprises all the pixel value of all the pixels of all the gray-scale slice images. Besides, above-mentioned accumulation value range comprise the at least three accumulation values which are different from each other.

Please be noted that because of the binary light module 204 only has ability of providing 2-levels of brightness variations, the liquid modeling material only has 2 levels of curing extents which are respectively fully curing (lighting on) and liquid (lighting off) when using the stereolithography 3D printing method of the related art.

In the status without using the 3D printing method of the present disclosed example, the 3D printer 20 controls the binary light module 204 to execute irradiation once (the irradiation time is consistent with a default fully curing time) based on a default modeling power to any printing position, so that the liquid modeling material at the irradiated printing position fully cured. In other words, the liquid modeling material at each irradiated printing position only has one level of curing extent when being irradiated.

In the present disclosed example, above-mentioned printing parameters are used to control the amount of receiving light of the corresponded printing position of each pixel during printing. Via adjusting the amount of receiving light of the corresponded printing position during printing after irradiating the corresponded printing position (such as adjusting an accumulative irradiation frequency or an accumulative irradiation time of each printing position during the binary light module 204 irradiates), the present disclosed example can make the liquid modeling material at each printing position have more levels of curing extent after irradiating the corresponded printing position.

Take controlling an accumulative lighting time of the binary light module 204 irradiating each printing position for example, the 3D printer 20 may control the binary light module 204 to irradiate based on a default modeling power. If the fully curing time of the liquid modeling material is 0.1 seconds (namely, the binary light module 204 must irradiate the liquid modeling material for 0.1 seconds based on the modeling power to make the liquid modeling material fully cure), the present disclosed example may control the binary light module 204 to irradiate the liquid modeling materials at the various printing positions for the different time (such as irradiating the liquid modeling material at the first printing position for 0.05 seconds, irradiating the liquid modeling material at the second printing position for 0.08 seconds, irradiating the liquid modeling material at the third printing position for 0.1 seconds, and so forth), so as to make the liquid modeling materials at the different printing position respectively have the different curing extents. For example, the curing extent of the liquid modeling material at the first printing position is 50%, the curing extent of the liquid modeling material at the second printing position is 80%, and the curing extent of the liquid modeling material at the third printing position is fully curing. Furthermore, the accumulative time of irradiating each printing position (namely, the accumulative lighting time of each printing position) is not larger than the fully curing time.

Besides, in this example, the maximum accumulation value of the accumulation value range is the fully curing time used to make the liquid modeling material cure fully based on the modeling power, at least one of the accumulation values is the partly curing time used to make the liquid modeling material cure partly based on the modeling power, and the minimum accumulation value is 0 (seconds).

In an example of controlling an accumulative lighting frequency of the binary light module 204 irradiating each printing position, the present disclosed example is to fix the lighting time which the binary light module 204 irradiating each time (the lighting time may be default single-time irradiation time, such as 0.1 seconds), and weaken the irradiation power (namely, replacing the modeling power with the weakening power) for reducing intensity of light energy (such as reducing to the one-tenth of the modeling power, the binary light module 204 must irradiate the liquid modeling material for 10 times based on the default single-time irradiation time to provide enough light energy to make the liquid modeling material fully cure), so as to achieve the purpose of the liquid modeling materials at the different printing position having the different curing extent.

More specifically, the present disclosed example may control the binary light module 204 to irradiate the liquid modeling materials at the various printing positions for the different frequency (such as irradiating the liquid modeling material at the first printing position for three times cumulatively, irradiating the liquid modeling material at the second printing position for sever times cumulatively, irradiating the liquid modeling material at the third printing position for ten times cumulatively, and so forth, wherein the continuous time of irradiating each time is the same single-time irradiation time), so as to make the liquid modeling materials at the different printing position respectively have the different curing extents (such as the curing extent of the liquid modeling material at the first printing position is 30%, the curing extent of the liquid modeling material at the second printing position is 70%, and the curing extent of the liquid modeling material at the third printing position is fully curing).

Besides, in this example, the maximum accumulation value of the accumulation value range is the fully curing frequency used to make the liquid modeling material cure fully based on the single-time irradiation time and the weakening power, at least one of the accumulation values is the partly curing time used to make the liquid modeling material cure partly based on the single-time irradiation time and the weakening power, and the minimum accumulation value is 0 (times).

Thus, via using the binary light module 204, the present disclosed example can achieve the multi-level stereolithography printing effect like the projection display module of the DLP 3D printer.

Please be noted that because the settable range (namely, accumulation value range) comprising the printing parameters of the binary light module 204 may be different from the pixel value full range, the present disclosed example executes the value-mapping process to map the pixel value from the pixel value full range to the accumulation value range, and configures the mapped value (accumulation value descripted later) as the printing parameter.

In one embodiment, the pixel value is positive proportional to the corresponded accumulation value. More specifically, the control module 200 is to configure the pixel value full range to be mapped to the accumulation value range in positive way. Namely, the maximum pixel value is mapped to the maximum accumulation value, the minimum pixel value is mapped to the minimum accumulation value.

Take controlling the accumulative lighting frequency based on the weakening power for example, if the gray-scale slice images are 8 bits gray-scale image which its pixel value full range is 0-255 and the accumulation value range of the binary light module 204 is 0-15 (the weakening power is one in fifteen of the modeling power), the present disclosed example may map the pixel value of each pixel of each gray-scale slice image to the accumulation value range, such as pixel values 0, 128 and 255 are mapped to the accumulation values 0, 8 and 15 (times).

Take controlling the accumulative lighting time based on the modeling power for example, if the pixel value full range of each gray-scale slice image is 0-255 and the fully curing time is 0.15 seconds, the accumulation value range of the binary light module 204 is 0-0.15 (namely, each accumulation value is not larger than the fully curing time). Besides, the present disclosed example may map the pixel value of each pixel of each gray-scale slice image to the accumulation value range, such as pixel values 0, 128 and 255 are mapped to the accumulation values 0, 0.08 and 0.15 (seconds).

Thus, the present disclosed example can select the appropriate accumulation value range to transform each pixel value into each printing parameter according to the hardware capacity of the binary light module 204 (such as the minimum power or minimum single-time irradiation time of the binary light module 204), so as to achieve the multi-level printing effect with the best fine degree of each position.

Besides, because mapping in positive way (namely, the pixel value is larger, the curing extent of the position in the physical 3D model corresponding to the pixel is higher), the variations of fine degree of the physical 3D model manufactured by the present disclosed example can further match the variations of colors of the corresponded 3D object, so as to further improve the print quality.

Please be noted that although above-mentioned description explains controlling the accumulative lighting frequency based on the weakening power, and controlling accumulative lighting time based on the modeling power, but this specific example is not intended to limit the scope of the present disclosed example. In the other embodiment, the present disclosed example may control the accumulative lighting time based on the weakening power. For example, when reducing the power of the binary light module 204 (such as the weakening power is half of the modeling power), the accumulation value range is expanded correspondingly (namely, the accumulation value range is expanded to 2 tomes, such as expansion from 0-0.16 to 0-0.32).

After step S22, the control module 200 controls the movable platform 202, the binary light module 204 and the galvanometric module 206 to start to execute stereolithography 3D printing layer by layer. First, the control module 200 executes the step S24: the control module 200 selecting one of the gray-scale slice image orderly. For example, when first time to execute the step S24, the control module 200 selects the first layer of the gray-scale slice image according to the layer number of each gray-scale slice image (namely, selecting the gray-scale slice image which its layer number is 1). When second time to execute the step S24, the control module 200 selects the second layer of the gray-scale slice image according to the layer number of each gray-scale slice image (namely, selecting the gray-scale slice image which its layer number is 2), and so forth.

Step S26: the control module 200 controls the binary light module 204 and the galvanometric module 206 to irradiate for executing stereolithography 3D printing to manufacture a layer of physical slice model corresponding to a layer of slice object.

Step S28: the control module 200 determines whether the printing had been finished. More specifically, the control module 200 determines whether the printing had been finished according to a layer number of the current selected gray-scale slice image. Namely, the control module 200 determines whether all of the gray-scale slice images had been selected and printed, and the physical 3D model corresponding to the 3D object had been manufactured.

If the control module 200 determines that the printing had been finished, the control module 200 terminates the 3D printing method. Otherwise, the control module 200 controls the movable platform 20 to rise (if the 3D printer 20 is down-illuminated stereolithography 3D printer) or to drop (if the 3D printer 20 is down-illuminated stereolithography 3D printer) a default slice thickness, and executes the step S24 and step S26 for selecting the other gray-scale slice image (such as the second layer of the gray-scale slice image) and executing the stereolithography 3D printing (such as printing the second layer of physical slice model corresponding to the second layer of the slice object).

The present disclosed example can achieve the 3D print effect of multi-level light module by the binary light module 204, so as to enhance the fine degree of the generated physical 3D model obviously.

Figure 4:
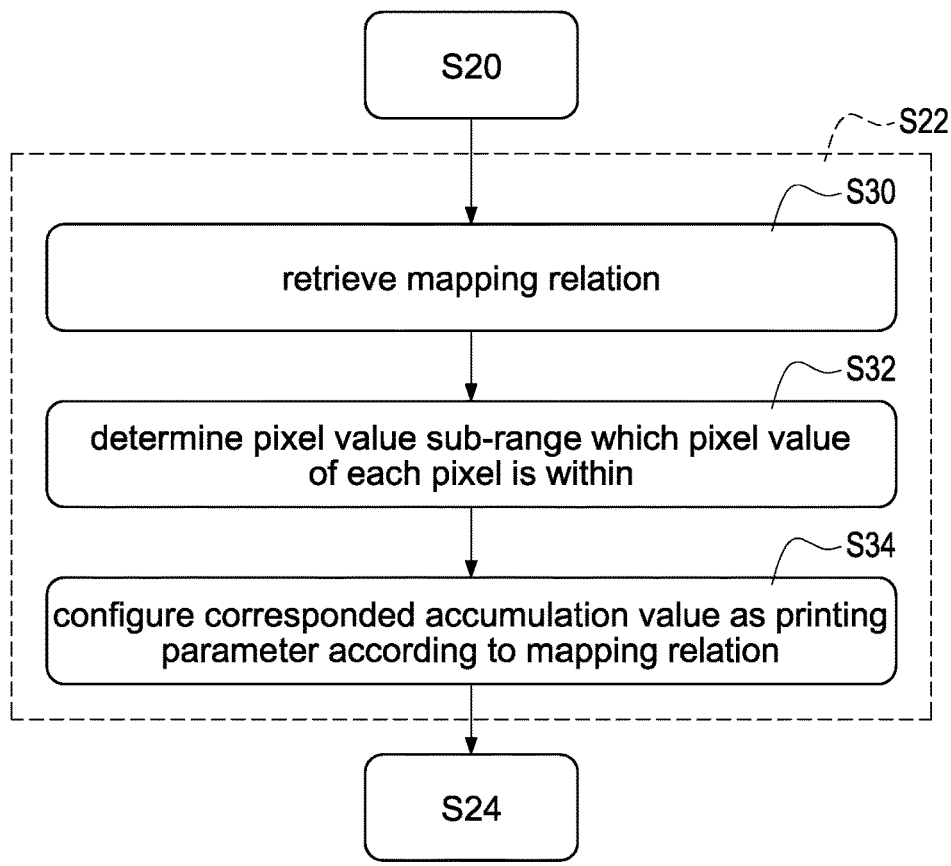
FIG. 4 is a partial flowchart of a 3D printing method according to the second embodiment of the present disclosed example.

Please refer to FIG. 3 and FIG. 4 simultaneously, FIG. 4 is a partial flowchart of a 3D printing method according to the second embodiment of the present disclosed example. Compare to the 3D printing method of the embodiment shown in FIG. 3, the step S22 of the 3D printing method of the embodiment further comprise following steps.

Step S30: the control module 200 retrieves the mapping relation, wherein the mapping relation make the pixel value sub-ranges of the pixel value full range correspond to the accumulation values of the accumulation value range one-by-one. Besides, each pixel value sub-range respective comprises the different pixel values, each pixel value sub-ranges is inversely proportional to the correspond accumulation value respectively.

Take controlling the accumulative lighting frequency based on the weakening power for example, if the gray-scale slice images are 10 bits gray-scale image which its pixel value full range is 0-1023 and the accumulation value range is 0-255 (the weakening power is 1/255 of the modeling power), the mapping relation may comprise following rules: pixel value 0-3 (pixel value sub-range) being mapped to accumulation value 0 (times); pixel value 4-7 (pixel value sub-range) being mapped to accumulation value 1 (times); pixel value 8-11 (pixel value sub-range) being mapped to accumulation value 2 (times); . . . ; pixel value 1020-1023 (pixel value sub-range) being mapped to accumulation value 255 (times).

Take controlling the accumulative lighting time based on the modeling power for example, if the pixel value full range of each gray-scale slice image is 0-1023, and the accumulation value range is 0-0.255 (namely, the fully curing time is 0.255 seconds), the mapping relation may comprise following rules: pixel value 0-3 (pixel value sub-range) being mapped to accumulation value 0 (seconds); pixel value 4-7 (pixel value sub-range) being mapped to accumulation value 0.001 (seconds); pixel value 8-11 (pixel value sub-range) being mapped to accumulation value 0.0022 (seconds); . . . ; pixel value 1020-1023 (pixel value sub-range) being mapped to accumulation value 0.255 (seconds).

Step S32: the control module 200 determines each pixel value sub-range which the pixel value of each pixel of each gray-scale slice image is within.

Step S34: the control module 200 configures each accumulation value corresponding to the pixel value of each pixel as the printing parameter of each pixel according to the mapping relation. For example, if the pixel value of the first pixel of the first gray-scale slice image is 1021, the control module 200 determines that the accumulation value corresponding to the first pixel is 255, and configures this accumulation value (255) as the printing parameter of the first pixel. Then, the control module 200 executes the step S24.

Figure 5:
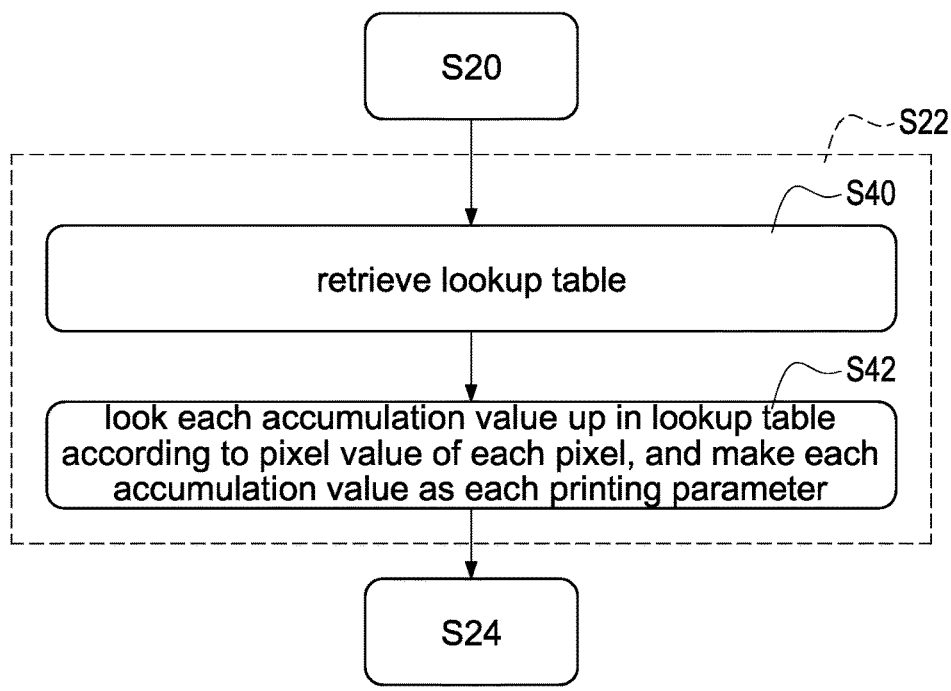
FIG. 5 is a partial flowchart of a 3D printing method according to the third embodiment of the present disclosed example.

Please refer to FIG. 3 and FIG. 5 simultaneously, FIG. 5 is a partial flowchart of a 3D printing method according to the third embodiment of the present disclosed example. Compare to the 3D printing method of the embodiment shown in FIG. 3, the step S22 of the 3D printing method of the embodiment further comprise following steps.

Step S40: the control module 200 retrieves a lookup table. More specifically, above-mentioned lookup table records a corresponded relation between all of the pixel values of the pixel value full range and all of the accumulation values of the accumulation value range.

Step S42: the control module 200 looks the accumulation value corresponding to the pixel value of each pixel up in the lookup table according to the pixel value of each pixel of each gray-scale slice image, and makes the looked accumulation value as the printing parameter of each pixel.

The present disclosed example can effectively reduce the process time and increase the print speed via looking the accumulation value corresponding to each pixel up in the lookup table.

Figure 6:
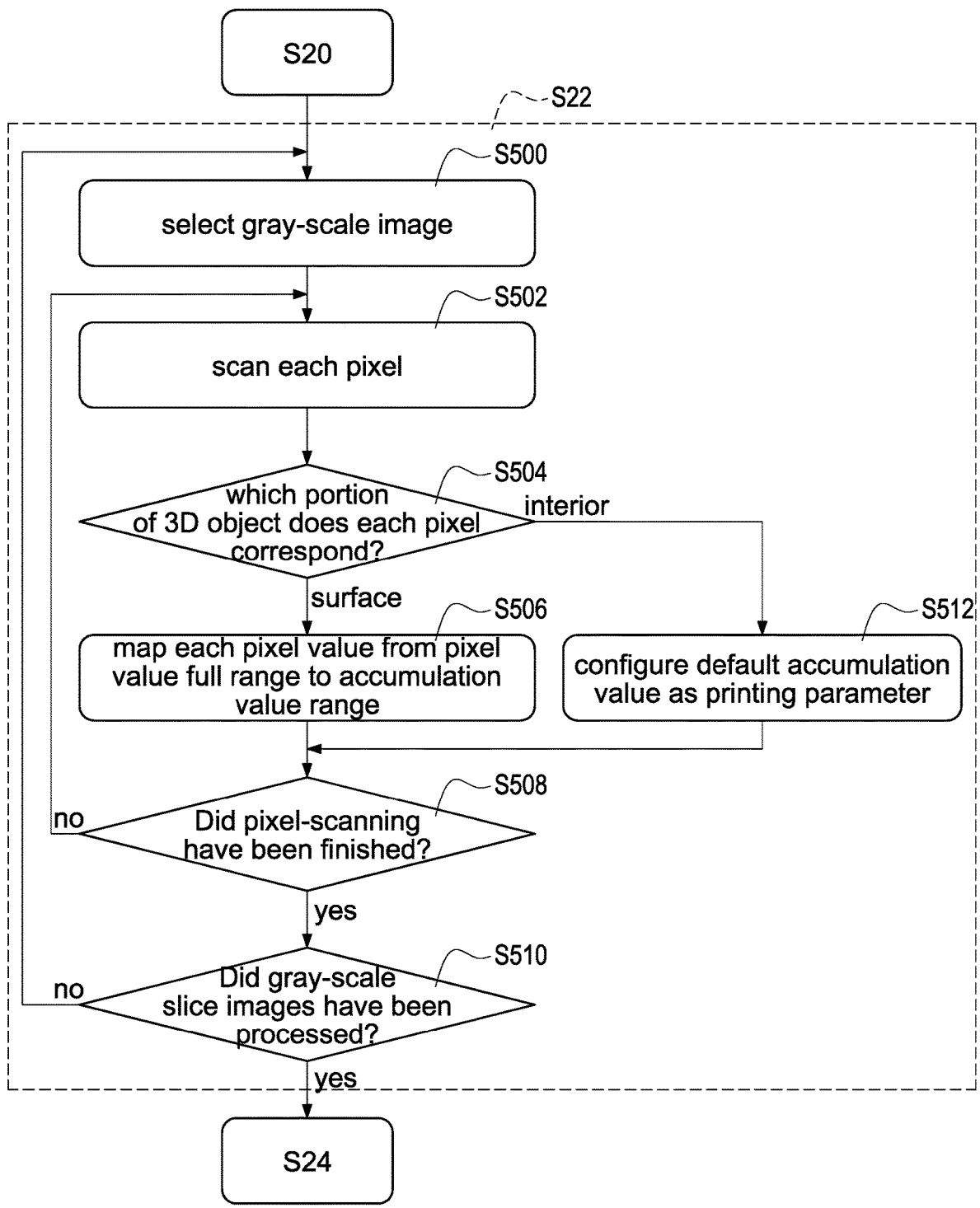
FIG. 6 is a partial flowchart of a 3D printing method according to the fourth embodiment of the present disclosed example.

Please refer to FIG. 3 and FIG. 6 simultaneously, FIG. 6 is a partial flowchart of a 3D printing method according to the fourth embodiment of the present disclosed example. Compare to the 3D printing method of the embodiment shown in FIG. 3, the step S22 of the 3D printing method of the embodiment further comprise following steps.

Step S500: the control module 200 selects one of the gray-scale slice images according to the layer number of each gray-scale slice image orderly.

Step S502: the control module 200 scans each pixel of the selected gray-scale slice image point-by-point.

Step S504: the control module 200 determines a portion of 3D object which the scanned pixel corresponds. More specifically, the control module 200 determines the scanned pixel corresponds to a surface portion of 3D object or an interior portion of 3D object. The control module 200 executes the step S506 when determining that the scanned pixel corresponds to the surface portion of 3D object, and executes the step S512 when determining that the scanned pixel corresponds to the interior portion of 3D object.

Step S506: the control module 200 maps the pixel value of the scanned pixel from the pixel value full range to the accumulation value range for obtaining one of the accumulation values, and makes the obtained accumulation value as the printing parameter of this pixel.

Step S508: the control module 200 determines whether all of the pixels of the selected gray-scale slice image had been scanned.

If all of the pixels of the selected gray-scale slice image had been scanned, the control module 200 executes the step S510. Otherwise, the control module 200 executes the step S502 again for scanning the other non-scanned pixel.

Step S510: the control module 200 determines whether all of the gray-scale slice images had been processed (namely, determining whether the pixels of all of the gray-scale slice image had be configured the printing parameters).

If all of the gray-scale slice images had been processed, the control module 200 execute step S24. Otherwise, the control module 200 executes the step S500 again for processing the other gray-scale slice images.

If the control module 200 determines that the scanned pixel corresponds to the interior portion of 3D object in step S504, the control module 200 executes step S512: the control module 200 configures the default accumulation value of the accumulation value range as the printing parameter of the scanned pixel.

In one embodiment, the default accumulation value may be the maximum value or intermediate value of the accumulation value range, but this specific example is not intended to limit the scope of the present disclosed example. Take the accumulation value range being 0-15 (15 represent the highest curing extent) for example, if the default accumulation value is the maximum accumulation value (15), the 3D printer 20 can provide enough light energy to make the liquid modeling material at the corresponded position (the interior portion of the physical 3D model) cure fully when printing the interior portion of the 3D object, so as to make the manufactured physical 3D model is with better strength. if the default accumulation value is not the maximum accumulation value, such as the intermediate accumulation value (8) or the other default accumulation value (10), the 3D printer 20 can provide enough light energy to make the liquid modeling material at the corresponded position cure partly when printing the interior portion of the 3D object, so as to save the amount of the liquid modeling materials used to manufacture the physical 3D model and reduce the printing cost.

The present disclose example can provide better flexibility of printing (such as high-intensity printing or low-cost printing) via configuring the printing parameter according to the portion of 3D object corresponding to the pixel.

Figure 7:
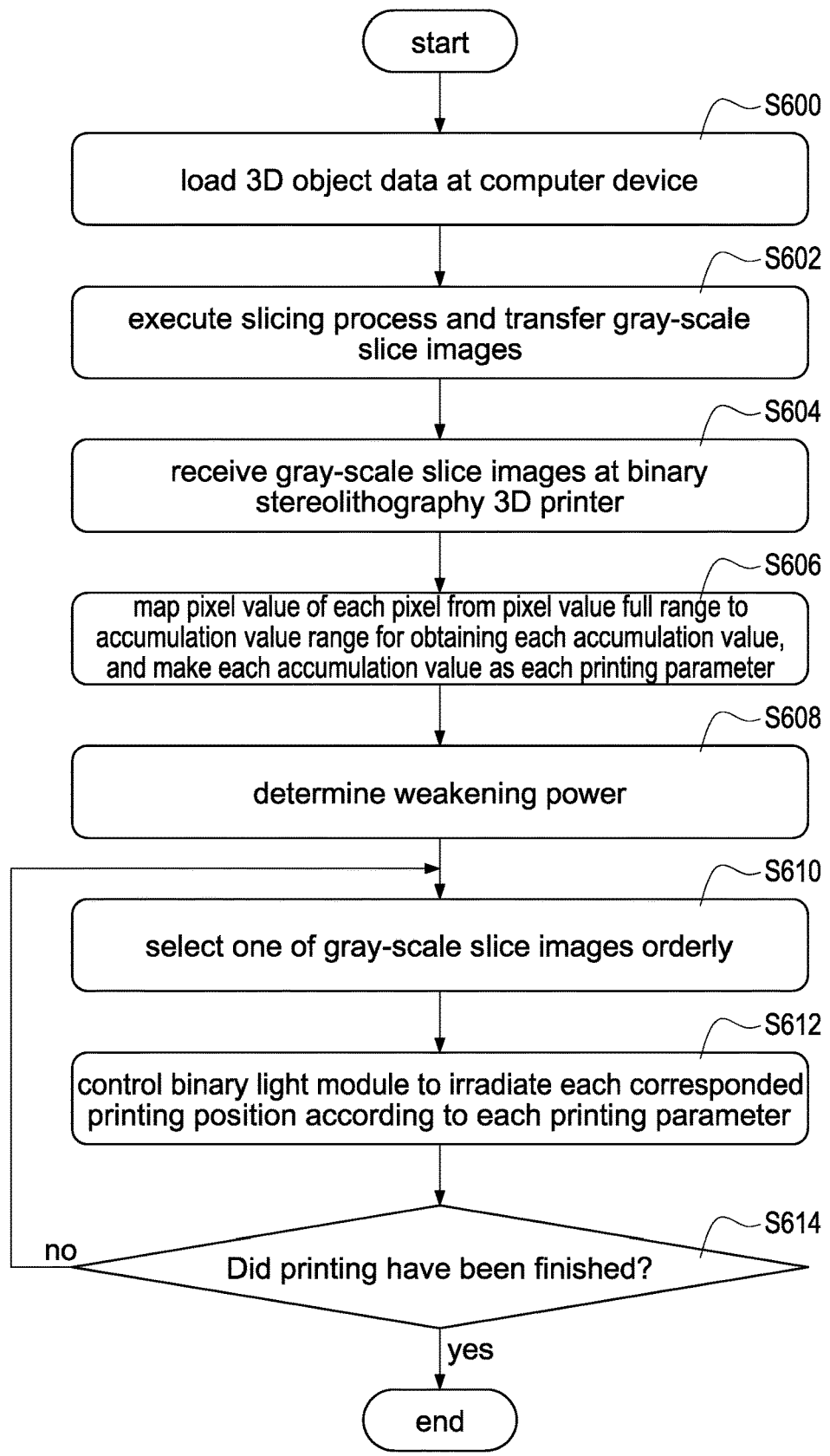
FIG. 7 is a flowchart of a 3D printing method according to the fifth embodiment of the present disclosed example.
Figure 8A:
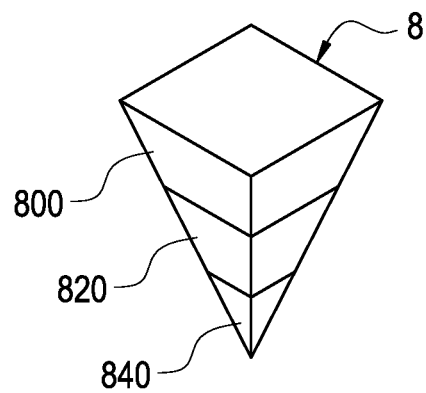
FIG. 8A is a schematic view of a 3D object according to the present disclosed example.
Figure 8B:
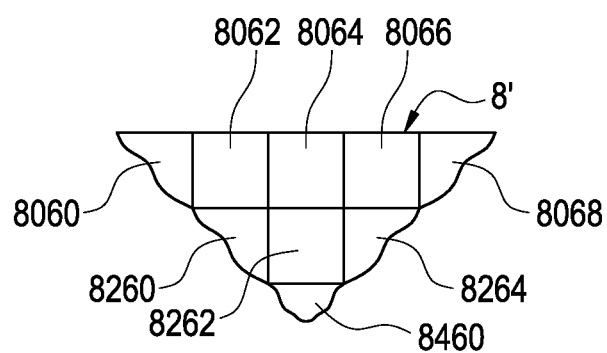
FIG. 8B is a schematic side-view of a physical 3D model according to the present disclosed example.

Please refer to FIG. 7 to FIG. 10C simultaneously, FIG. 7 is a flowchart of a 3D printing method according to the fifth embodiment of the present disclosed example, FIG. 8A is a schematic view of a 3D object according to the present disclosed example, FIG. 8B is a schematic side-view of a physical 3D model according to the present disclosed example, FIG. 9A is a schematic view of the first gray-scale slice image according to the present disclosed example, FIG. 9B is a schematic view of the second gray-scale slice image according to the present disclosed example, FIG. 9C is a schematic view of the third gray-scale slice image according to the present disclosed example, FIG. 10A is a schematic view of the printing parameters of the first gray-scale slice image according to the present disclosed example, FIG. 10B is a schematic view of the printing parameters of the second gray-scale slice image according to the present disclosed example, FIG. 10C is a schematic view of the printing parameters of the third gray-scale slice image according to the present disclosed example.

In this embodiment, after the slicing software 220 is executed by the computer device 22 or the control module 200 of the 3D printer 20 (take the computer device 22 executing the slicing software 220 for example in following description), the slicing software 220 may control the computer device 22 or 3D printer 20 to execute steps S600-S602. Besides, after the printing software is executed by the control module 200, the printing software may control the 3D printer 20 to execute steps S604-S614.

Step S600: the control module 200 loads 3D object data corresponding to a set of 3D object (such as the 3D object 8 shown in FIG. 8A).

Step S602: the computer device executes the slicing process to the loaded 3D object data for slicing the 3D object 8 into a plurality of the slice object (rake slicing the 3D object 8 into three layers of the slice object 800, 820, 840 for example), and generates the gray-scale slice images corresponding to each slice object 800, 820, 840. As shown in FIG. 9A to FIG. 9C, the gray-scale slice image 802, 822, 842 are 8-bits gray-scale slice image, wherein the gray-scale slice image 802 corresponds to the slice object 800, the gray-scale slice image 822 corresponds to the slice object 820, and the gray-scale slice image 842 corresponds to the slice object 840.

Then, the computer device 22 transfers the generated the gray-scale slice image 802, 822, 842 to the 3D printer 20.

Step S604: the control module 200 of the 3D printer 20 receives the gray-scale slice images 802, 822 and 842 via connection module 212.

Step S606: the control module 200 maps the pixel value of each pixel of each gray-scale slice image 802, 822, 842 in a positive way from the pixel value full range to the accumulation value range for obtaining each accumulation value, and make each accumulation value as each printing parameter of each pixel.

In one embodiment, the control module 200 executes above-mentioned mapping process when determining that the pixel corresponds to the surface portion of the 3D object 8, and directly makes the maximum accumulation value of the accumulation value range as the printing parameter od the pixel when determining that the pixel corresponds to the interior portion of the 3D object 8.

Take controlling the accumulative lighting frequency based on the weakening power for example, as shown in FIG. 10A to FIG. 10C, the accumulation value range is 0-3, the mapping relation may comprise following rules: pixel value 0-63 being mapped to accumulation value 0 (times); pixel value 64-127 being mapped to accumulation value 1 (times); and, pixel value 128-191 (pixel value sub-range) being mapped to accumulation value 3 (times). An array 804 records the printing parameters of each pixel of the gray-scale slice image 802, an array 824 records the printing parameters of each pixel of the gray-scale slice image 822, and an array 844 records the printing parameters of each pixel of the gray-scale slice image 842.

Because mapping in positive way, the pixel value of each pixel of the present disclosed example is proportional to the corresponded printing parameter, such as the pixel value 255 corresponding to the printing parameter 3, the pixel value 190 corresponding to the printing parameter 2, the pixel value 125 corresponding to the printing parameter 1, and so forth Step S608: the control module 200 determines the weakening power.

In the example of controlling the accumulative lighting frequency based on the weakening power, the printing parameter is a power-related parameter, the control module 200 determines the weakening power according to the accumulation value range and the default modeling power of the 3D printer 20. More specifically, the control module 200 determines the weakening power according to the modeling power and a number of the non-zero accumulation value of the accumulation value range.

For example, if the accumulation value range comprises four accumulation values, 0, 1, 2, 3 (three non-zero accumulation values), the control module 200 may configure the weakening power to be one third of modeling power. If the accumulation value range comprises ten non-zero accumulation values (such as the accumulation value range is 0-10), the control module 200 may configure the weakening power to be one tenth of modeling power, and so on.

Step S610: the control module 200 selects one of the gray-scale slice image 802, 822, 842 orderly (take selecting the first layer of the gray-scale slice image 802 for example).

Step S612: the control module 200 controls the galvanometric module 206 according to the printing parameter of each pixel if the selected gray-scale slice image to make the binary light module 204 irradiate the printing position in the modeling tank 214 corresponding to each pixel orderly.

In the example of controlling the accumulative lighting time based on the modeling power, the step S608 may be omitted, the printing parameters are default lighting time. The control module 200 controls the binary light module 204 and the galvanometric module 206 to irradiate based on the modeling power the printing position in the modeling tank 214 corresponding to each pixel, until the lighting time of each printing position is consistent with the printing parameter of each pixel.

In the example of controlling the accumulative lighting frequency based on the weakening power. The control module 200 controls the binary light module 204 and the galvanometric module 206 to continuously or intermittently irradiate based on the weakening power determined in step S608 the printing position in the modeling tank 214 corresponding to each pixel many times (the irradiation time each time is the default single-time irradiation time), until the lighting frequency of each printing position is consistent with the printing parameter of each pixel.

Step S614: the control module 200 determines whether the printing had been finished. If the control module 200 determines that the printing had been finished, the control module 200 terminates the 3#printing method. Otherwise, the control module 200 controls the movable platform 20 to move the default slice thickness, and executes the step S610 and step S612 again for printing the next layer of physical slice model.

As shown in FIG. 8B, the first layer of the interior portion 8062, 8064, 8066 and the second layer of the interior portion 8262 of the physical 3D model 8' manufactured by the present disclosed example fully cure (namely, the corresponded printing parameter is the maximum accumulation value) because having received enough light energy during printing. The first layer of the surface portion 8060, 8068, the second layer of the surface portion 8260, 8264 and the third layer of the surface portion 8460 of the physical 3D model 8' manufactured by the present disclosed example partly cure (namely, the corresponded printing parameter is not the maximum accumulation value) because having not received enough light energy during printing, so as to appear the different heights and reduce the hierarchy effect of the surface portion of the physical 3D model 8', and further to improve the printing quality of the physical 3D model 8'.

Figure 11A:
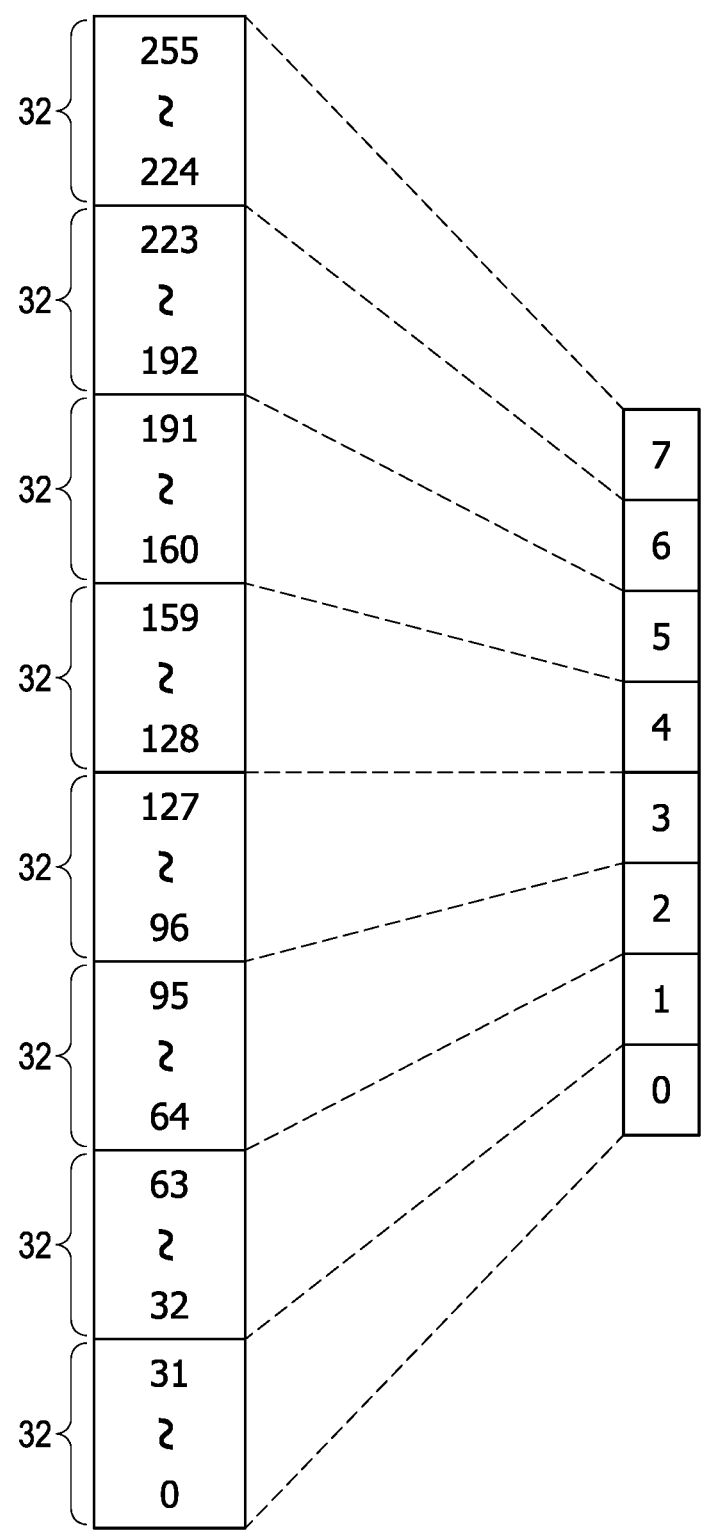
FIG. 11A is a schematic view of a mapping relation between a pixel value full range and an accumulation value range according to one embodiment of the present disclosed example.
Figure 11B:
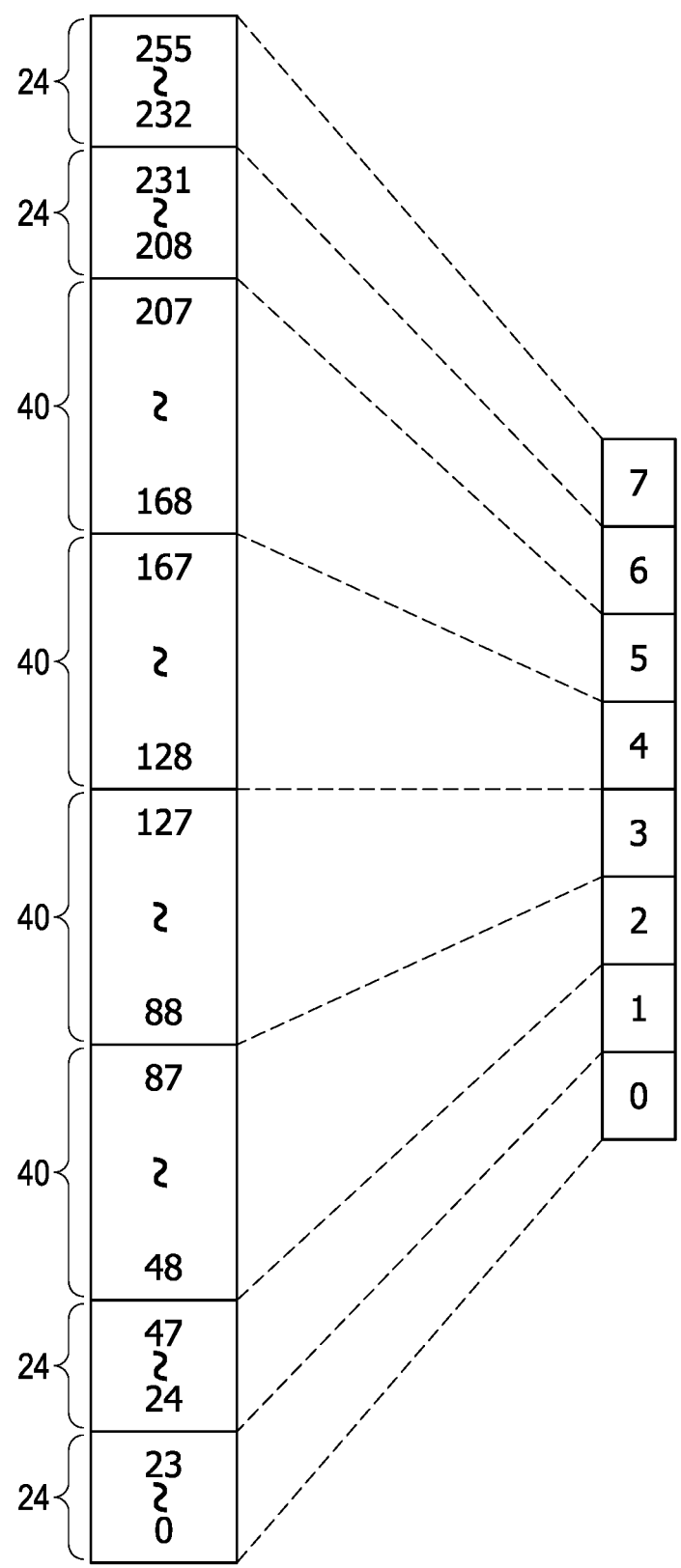
FIG. 11B is a schematic view of a mapping relation between a pixel value full range and an accumulation value range according to the other embodiment of the present disclosed example.
Figure 11C:
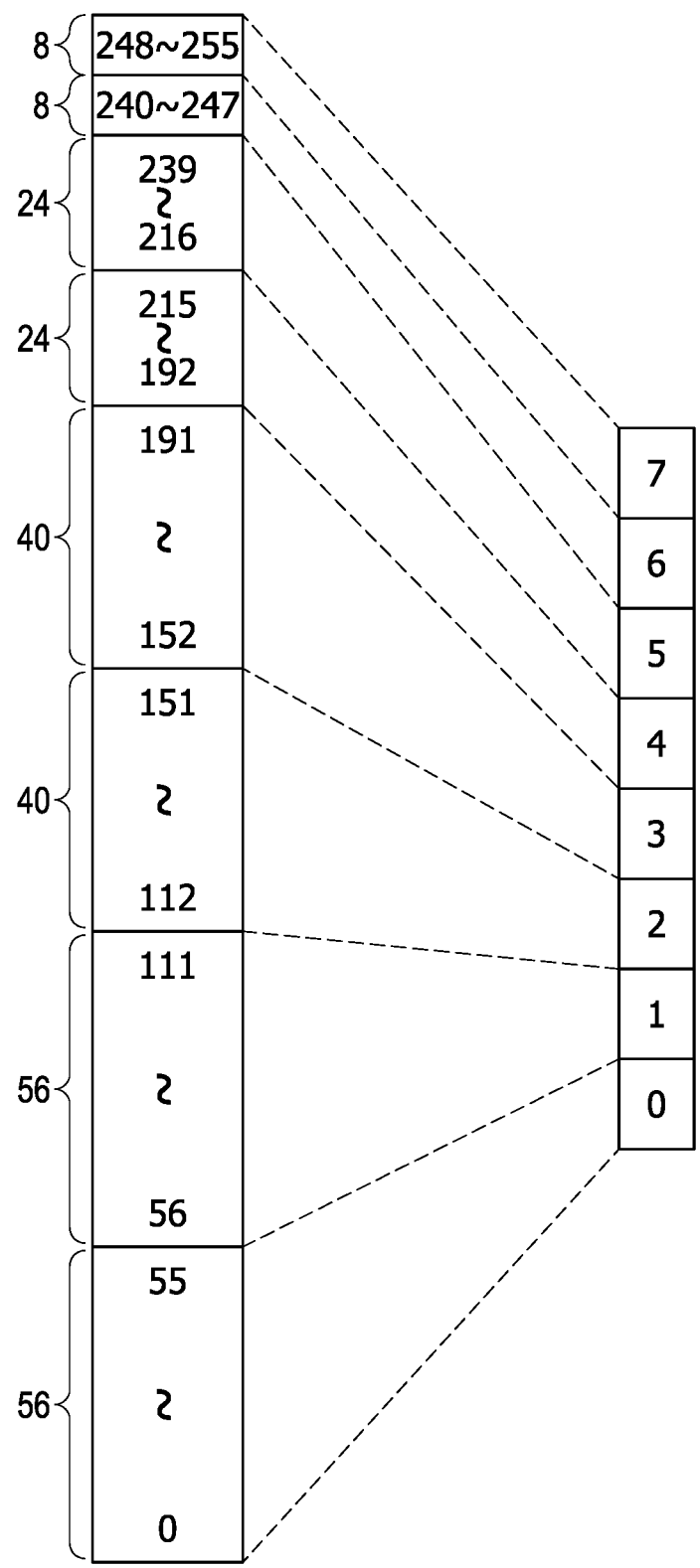
FIG. 11C is a schematic view of a mapping relation between a pixel value full range and an accumulation value range according to the other embodiment of the present disclosed example.

Following description is used to illustrate a mapping relation between a pixel value full range and an accumulation value range. Please refer to FIG. 11A to FIG. 11C simultaneously, FIG. 11A is a schematic view of a mapping relation between a pixel value full range and an accumulation value range according to one embodiment of the present disclosed example, FIG. 11B is a schematic view of a mapping relation between a pixel value full range and an accumulation value range according to the other embodiment of the present disclosed example, and FIG. 11C is a schematic view of a mapping relation between a pixel value full range and an accumulation value range according to the other embodiment of the present disclosed example. Following description takes controlling the accumulative lighting frequency of the binary light module 204 irradiating each printing position for example. Besides, in following description, the pixel value full range is 0-255 (namely, the gray-scale slice images are 8-bits gray-scale image), the accumulation value range is 0-7 times (namely, 8 levels of brightness variations may be provided).

In the present disclosed example, the pixel value full range may be divide into a plurality of pixel value sub-ranges. Furthermore, the number of the pixel value sub-ranges is same as the number of the accumulation values of the accumulation value range, each accumulation value range is mapped to an accumulation value. Besides, the number of pixel value of each accumulation value may be same as each other or different from each other.

Take the number of pixel value of each accumulation value being same as each other for example, as shown in FIG. 11A, the pixel value full range may be divided into eight pixel value sub-ranges as following: 0-31 (mapped to accumulation value 0), 32-63 (mapped to accumulation value 1), 64-95 (mapped to accumulation value 2), 96-127 (mapped to accumulation value 3), 128-159 (mapped to accumulation value 4), 160-191 (mapped to accumulation value 5), 192-223 (mapped to accumulation value 6), and 224-255 (mapped to accumulation value 7). Besides, each pixel value sub-range comprises 32 pixel values.

Take the number of pixel value of each accumulation value being different from each other for example, as shown in FIG. 11B, the pixel value full range may be divided into eight pixel value sub-ranges as following: 0-23 (mapped to accumulation value 0), 24-47 (mapped to accumulation value 1), 48-87 (mapped to accumulation value 2), 88-127 (mapped to accumulation value 3), 128-167 (mapped to accumulation value 4), 168-207 (mapped to accumulation value 5), 208-231 (mapped to accumulation value 6), and 232-255 (mapped to accumulation value 7). Besides, the pixel value sub-ranges 0-23, 24-47, 208-231, 232-255 only comprise 24 pixel values, and the pixel value sub-ranges 48-87, 88-127, 128-167, 168-207 comprise 40 pixel values.

Please be noted that a relation between the curing extent of liquid modeling material and the amount of received light is not the perfect linear relation. Besides, because of the material, process or printing environment being not perfect, the actual curing extent of the irradiated liquid modeling materials is not actually the same each time. Above-mentioned reasons make the relation between the curing extents of the liquid modeling material and the accumulation values is not perfect linear relation. Thus, when the numbers of the pixel values corresponding to each accumulation value are same as each other, the variation of the curing extents of the liquid modeling material may not be truthfully reflected the variation of pixel values.

For example, the number of the pixel values corresponding to each accumulation value is 32. The curing extent of the liquid modeling material irradiated 1 time is 10%, the curing extent of the liquid modeling material irradiated 2 time is 20%, the curing extent of the liquid modeling material irradiated 3 times is 50%, the curing extent of the liquid modeling material irradiated 4 times is 70%, the curing extent of the liquid modeling material irradiated 5 times is 90%, the curing extent of the liquid modeling material irradiated 6 time is 95%, and the curing extent of the liquid modeling material irradiated 7 or more times is 100%.

Thus, this embodiment can make the variation of curing extents of the liquid modeling material is more consistent with the variation of the pixel value via reducing the numbers of pixel values corresponding to the low accumulation value (such as the accumulation value 0, 1 shown in FIG. 11B) and high accumulation value (such as the accumulation value 6, 7 shown in FIG. 11B) and increasing the numbers of pixel values corresponding to the middle accumulation value (such as the accumulation value 2-5 shown in FIG. 11B), so as to improve the printing quality.

In another embodiment, as shown in FIG. 11C, the pixel value full range may be divide into eight pixel value sub-ranges, the number of the pixel values of each pixel value sub-range is gradually diminishing as following: pixel value sub-range 0-55 (mapped to the accumulation value 0), pixel value sub-range 56-111 (mapped to the accumulation value 1), pixel value sub-range 112-151 (mapped to the accumulation value 2), pixel value sub-range 152-191 (mapped to the accumulation value 3), pixel value sub-range 192-215 (mapped to the accumulation value 4), pixel value sub-range 216-239 (mapped to the accumulation value 5), pixel value sub-range 240-247 (mapped to the accumulation value 6), and pixel value sub-range 248-255 (mapped to the accumulation value 7). Besides, pixel value sub-range 0-55, 56-111 comprise 56 pixel values, pixel value sub-range 112-151, 152-191 only comprise 40 pixel values, pixel value sub-range 192-215, 216-239 only comprise 24 pixel values, and, pixel value sub-range 240-247, 248-255 only comprise 8 pixel values.

The above mentioned are only preferred specific examples in the present disclosed example, and are not thence restrictive to the scope of claims of the disclosed example. Therefore, those who apply equivalent changes incorporating contents from the present disclosed example are included in the scope of this application, as stated herein.

What is claimed is:

1. A 3D printing method for binary stereolithography 3D printer, the 3D printing method being applied to a binary stereolithography 3D printer (20), the 3D printing method comprising following steps:
   a) retrieving a plurality of gray-scale slice images (802, 822,842) corresponding to a 3D object;
   b) mapping a pixel value of each pixel value of each gray-scale image (802,822,842) from a pixel value full range to an accumulation value range for obtaining one of at least three accumulation values and making the obtained accumulation value as a printing parameter of each pixel, wherein the accumulation value range comprises the at least three accumulation values, the pixel value full range comprises all the pixel values of all the pixels of all the gray-scale images (802,822,842);
   c) selecting one of the gray-scale slice images (802,822, 842) orderly;
   d) controlling a binary light module (204) of the binary stereolithography 3D printer (20) to irradiate for manufacturing a layer of physical slice model (320,322,340, 342) according to the printing parameter of each pixel of the selected gray-scale slice image (802,822,842); and
   e) executing the steps c) to the step d) repeatedly until a physical 3D model corresponding to the 3D object is manufactured;
   wherein the step b) comprises following steps:
   b1) retrieving a mapping relation of one-by-one mapping at least three pixel value sub-ranges of the pixel value full range to the at least three accumulation values of the accumulation value range, wherein each pixel value sub-range respectively comprises a plurality of pixel values which are different from each other; and
   b2) determining each pixel value sub-range which the pixel value of each pixel is within, and configuring each corresponded accumulation value as the printing parameter of each pixel according to the mapping relation.

2. The 3D printing method according to claim 1, wherein a number of the pixels of one of the pixel value sub-range is different from a number of pixels of another pixel value sub-range.

3. The 3D printing method according to claim 1, wherein the step b) comprises a step b4) mapping the pixel value of the pixel value from the pixel value full range to the accumulation value range for obtaining one of the at least three accumulation values and making the obtained accumulation value as the printing parameter of each pixel when determining that any pixel corresponds to a surface of the 3D object.

4. The 3D printing method according to claim 3, wherein the step b) further comprises a step b5) configuring the printing parameter of the pixel as a default accumulation value within the accumulation value range when determining that any pixel corresponds to an interior of the 3D object.

5. The 3D printing method according to claim 1, wherein the binary stereolithography 3D printer (20) comprises a modeling tank (214) used to contain liquid modeling material (30), the step d) is configured to control the binary light module (204) to respectively irradiate each printing position in the modeling tank (214) corresponding to each pixel based on a default curing power until an accumulative lighting time being consistent with the printing parameter of each pixel elapses.

6. The 3D printing method according to claim 5, wherein a maximum of the accumulation values is a fully curing time which making the liquid modeling material (30) completely cured when irradiating the liquid modeling material (30) based on a curing power for the fully curing time, one of the accumulation values is a partly curing time which making the liquid modeling material (30) partly cured when irradiating the liquid modeling material (30) based on a curing power for the partly curing time, a minimum of the accumulation values is 0.

7. The 3D printing method according to claim 1, wherein the binary stereolithography 3D printer (20) comprises a modeling tank (214) used to contain liquid modeling material (30), the step d) is configured to control the binary light module (204) to respectively irradiate each printing position in the modeling tank (214) corresponding to each pixel based on a single-time irradiation time and a weakening power until an accumulative lighting frequency of each printing position is consistent with the printing parameter corresponding to each pixel.

8. The 3D printing method according to claim 7, wherein the maximum accumulation value is a fully curing frequency which making the liquid modeling material (30) completely cured when irradiating the liquid modeling material (30) based on the fully curing frequency and the weakening power, one of the accumulation values is a partly curing frequency which making the liquid modeling material (30) partly cured when irradiating the liquid modeling material (30) based on the fully curing frequency and the weakening power, the minimum accumulation value is 0.

9. The 3D printing method according to claim 7, wherein the 3D printing method further comprises a step d0) before the step d), determining the weakening power according to a number of the at least three accumulation values of the accumulation value range and a default curing power of the binary light module (204), wherein the weakening power is less than the curing power.

10. The 3D printing method according to claim 1, wherein the binary stereolithography 3D printer (20) comprises a galvanometric module (206) comprising a plurality of prisms, the binary light module (204) is point light source and irradiates a light beam toward the galvanometric module (206), the step d) is configured to control the galvanometric module (206) to change a plurality of angles of the plurality of the prisms to make the light beam irradiate to a printing position corresponding to each pixel orderly according to the printing parameter of each pixel.

11. The 3D printing method according to claim 1, wherein the 3D printing method comprises following steps before the step a):
   a01) loading a 3D object data corresponding to a 3D object (8); and
   a02) executing a slicing process to the 3D object data for generating the plurality of the gray-scale slice images (802,822,842).

* * * * *